June 7, 1966 R. B. WALLACE 3,254,689
NUT HAVING AN ANGULARLY DISPOSED LOCKING INSERT
Filed Aug. 31, 1964
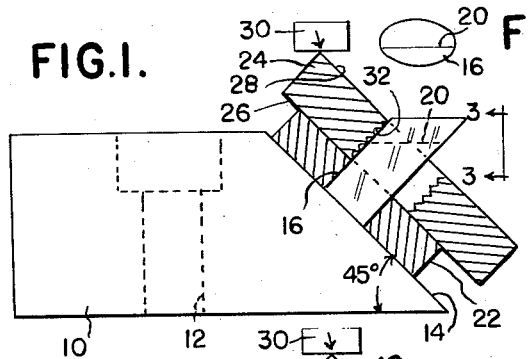
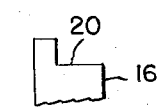
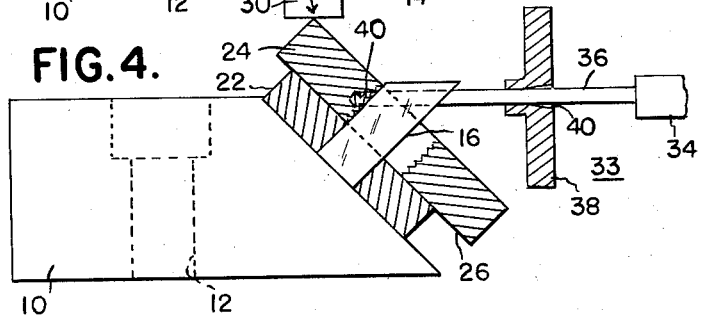
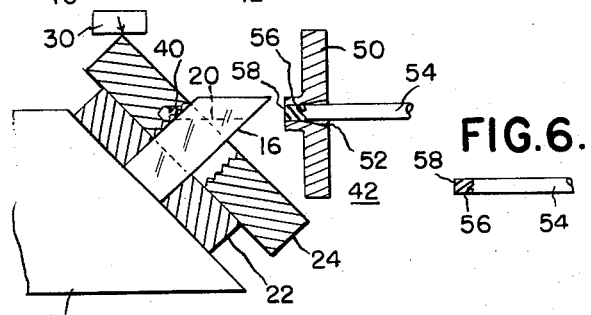
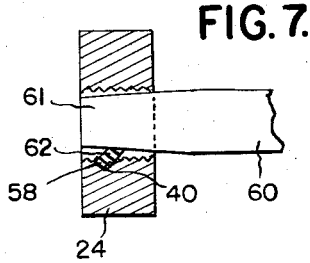
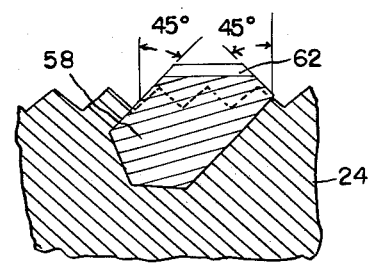
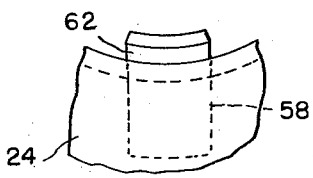
INVENTOR.
RICHARD B. WALLACE
BY
ATTORNEYS

United States Patent Office 3,254,689
Patented June 7, 1966

3,254,689
NUT HAVING AN ANGULARLY DISPOSED
LOCKING INSERT
Richard B. Wallace, Bloomfield Hills, Mich., assignor to
The Oakland Corporation, Birmingham, Mich., a corporation of Michigan
Filed Aug. 31, 1964, Ser. No. 394,385
1 Claim. (Cl. 151—7)

This is a continuation-in-part application of my co-pending application, Serial No. 155,134 entitled, "Friction Nut and Method and Apparatus for Making the Same," filed on November 27, 1961, and now abandoned.

This invention relates to a friction lock nut and more particularly to a friction lock nut having a plug of deformable material therein which will present the same angle to the approaching end of a threaded screw or fastener independently of which side of the nut is used.

The prior art shows various arrangements of a lock nut utilizing a plug of deformable material. As an example, the Brutus Patent 2,520,122 discloses an arrangement in which the nylon plug is inserted into a recess provided in the nut which has an axis at about a 25° angle with respect to the axis of the nut. As a result one side of the plug extends into the threaded opening at about a 65° angle. With such a construction there is a tendency for the end of the mating threaded fastener to shear off the projecting portion of the plug. With the present invention the sides of the projecting portion of the plug make approximately a 45° angle so that a side of the plug will present the same angle to the approaching end of a fastener regardless of which side of the nut is first approached by the fastener.

The present invention has another important advantage over the prior art in that the plug completely fills the recess provided in the nut. As an example, in Brutus, a void is provided between the bottom of the plug, which is made from nylon, and the bottom of the recess. Also, in the Boots Patent No. 2,462,603, a radial hole is drilled from the outside of the nut into the threaded interior thereof. A nylon plug or pin which is provided with a head is inserted in the hole. The exterior surface of the nut is then staked, thereby holding the plug in the nut. The staking operation, however, does not completely cover the head of the nylon plug with the result that the plug is in communication with the outside of the nut. Regardless of whether the Brutus or the Boots threaded locking nut is utilized, in heat applications the nylon plug softens and migration of the nylon appears to be outwardly with respect to the axis of the nut, thus reducing the inward protrusion of the nylon plug and reducing the effectiveness of the plug. While Brutus has a nut provided with a blind recess as in the present invention, the advantage over Brutus as well as the Boots locking device is that migration of the nylon is directed only inwardly towards the axis of the nut. In both Brutus and Boots, the plug is subjected to migration under heat which occurs in a radial outwardly direction.

An object of the present invention is to provide a friction lock nut provided with a blind recess which is adapted to receive a plug of deformable material which completely fills the recess and which includes a portion extending outwardly from the open end of the recess a predetermined distance, said portion being adapted to engage and form a friction lock with a mating externally threaded member.

Another object of the present invention is to provide a friction lock nut provided with a blind recess having an axis located at approximately a 45° angle with respect to the axis of the nut and which is adapted to receive an insert or plug of friction material which forms a friction lock with a mating threaded member, the sides of the plug projecting beyond the threads into the bore of the nut and forming angles of approximately 45° with the axis of the nut.

Still another object of the present invention is to provide a friction lock nut of the aforementioned type wherein the sides of the plug are inclined at an angle in the range of 35°–55° with respect to the axis of the bore.

Another object of the present invention is to provide a friction nut of the aforementioned type in which the end face of the plug facing the bore of the nut is approximately of concave cylindrical formation.

Still another object of the present invention is to provide a friction lock nut of the aforementioned type in which a side of the plug will present approximately the same angle to the approaching end of a screw independent of which side of the nut is used.

A further object of the present invention is to provide a friction lock nut of the aforementioned type wherein migration of the plug under heat, if any, is radially outwardly of the recess towards the axis of the nut, thus causing more protrusion of the plug.

It is another object of this invention to provide a simplified low cost friction nut of the aforementioned type having certain advantages contributing to efficiency, reliability and long life.

These and other objects will become apparent as the description proceeds, especially when taken in connection with the accompanying drawing, wherein:

FIG. 1 is a vertical view partly in section of the apparatus for making a threaded nut.

FIG. 2 is a plan view of the mandrel illustrated in FIG. 1 showing the guide opening provided therein.

FIG. 3 is a partial side elevation of the mandrel illustrated in FIG. 1 looking in the direction of arrows 3—3.

FIG. 4 is an elevational view illustrating the manner in which the blind recess is provided in the nut by a drilling operation.

FIG. 5 is an elevational view partly in section showing the manner in which the plastic plug is moved through the guide opening and inserted in the recess provided in the nut.

FIG. 6 is a view illustrating the pointed tip on the end of the plunger which is adapted to pick up the cut plastic plug and insert it into the recess provided in the nut.

FIG. 7 illustrates the manner in which a tapered mandrel is employed to force the plastic plug into the blind recess of the nut thereby completely filling the recess, and to provide the inwardly facing end surface of the plug with a shape of approximately concave cylindrical formation.

FIG. 8 is a fragmentary view of the nut showing the plug in an assembled position.

FIG. 9 is a partial elevational view looking to the left in FIG. 8.

Referring now to the drawing, the fixture is designated by the numeral 10 and is adapted to be connected to a rotatable support surface or the like of a machine, not shown, by means of a pair of bolts which are adapted to be inserted in the openings 12. The fixture 10 has a mounting surface 14 located at an angle of approximately 45° with respect to the support. A mandrel 16 is located on the mounting surface 14 and has its axis substantially perpendicular thereto as illustrated in FIG. 1. The mandrel 16 has a diameter which is preferably substantially less than the threaded opening provided in the nut 24. The mandrel 16 is provided on the free end thereof with guide surfaces 20, as best illustrated in FIG. 3. A spacer 22 is mounted on the lower end of the mandrel 16 adjacent to the support surface 14.

In operation, a nut 24 is mounted on the mandrel 16 in such a manner that the sides 26 and 28 thereof are substantially parallel to the mounting surface 14. Clamping means 30 are provided for urging the threads 32 on one side of the nut 24 against one side of the mandrel 16 as illustrated. After the nut 24 has been mounted in the position illustrated in FIG. 1 with the clamping means 30 positioned so as to hold the nut 24 against the mandrel 16, the fixture 10 is moved to a drilling station 33 provided on the machine as illustrated in FIG. 4. The drilling station 33 includes a drill 34 having a drill bit 36 and a drill guide 38 which includes a tapered passage 40. At the drilling station 33, the drill bit 36 is moved across the guide surfaces 20 provided in the mandrel 16 into the wall of the nut 24 so as to drill the recess 40 to the requisite depth.

After the nut 24 has been recessed, the fixture 10 is rotated to the plugging station 42 as illustrated in FIGURE 5. A mechanism for cutting the plug from plastic material is described in my U.S. Patent 2,980,928. The mechanism includes generally a tubular cutter, not illustrated, the forward end of which is tapered, and which terminates in a sharp cutting edge. The cutter is generally slidably received in a bushing which at its forward end receives a guide member 50 having an opening 52 therein of a size to receive a cut cylindrically shaped plug or disc 58 of plastic material, such as nylon, as it is advanced therethrough. The plugging station 42 further includes a plunger 54 having at the forward end thereof a pointed tip 56 which is adapted to pick up the cut cylindrical plug 58 and move it through the tapered passage 52. The plunger 54 is further moved to the left as viewed in FIG. 5 so as to move the cylindrical plug 58 through the guide openings 20 provided in the mandrel 16 into press-fit engagement with the recess 40 provided in the nut 24.

After the plug 58 has been inserted in the recess 40 of the nut 24, the nut 24 is removed from the mandrel 16. The nut 24 is then retained in an appropriate fixed position opposite a mandrel 60 which may be tapered or cylindrical. As illustrated the mandrel 60 has a tapered end 61. The tapered mandrel 60 is moved through the bore of the nut 24 so as to move the plug 58 into the recess 40 to completely fill the recess 40 and to provide a permanent shape to the inwardly facing projecting portion 62 of the plug 58 which is best adapted to cooperate with the mating bolt. In other words, the inwardly facing end surface of the plug 58 is permanently pressure formed to a concave shape due to the internal forces in the plastic material created by the very great pressure applied by the mandrel 60. Thus the internal forces hold the concave shape of the protruding end of the plug 58 thereby overcoming the plastic memory of the plug material.

A second important result of the use of the mandrel 60 is that it forces the nylon plug 58 into the drilled recess 40 under very great pressure to permanently deform the plug to conform to and completely fill the recess 40 thereby eliminating the void at the bottom of the recess 40. With such a construction the nut 24 of the present invention has considerably more heat resistance than prior art constructions. In heat applications, the nylon plug 58 softens so that migration under heat, if any, is radially outwardly of the recess 40, thus causing more protrusion of the nylon material.

The method and apparatus of the present invention involves the use of suporting the previously threaded nut 24 on a support mandrel 16 which enters into the threaded hole of the nut 24. The nut 24 is then pressed laterally against one side of the support mandrel 16. The outer end of the support mandrel 16 is beveled off at the angle of the drill 36 and a drill guide recess is provided by surfaces 20 at the outer end of the mandrel 16. The illustrated shape of the mandrel recess provided by surfaces 20 is important because of the angle between the drill and nut and offers the advantages of ready chip clearance, oil flow and also prevents an interlock between the projecting portion of the inserted nylon plug 58 and a completely cylindrical drill guide. It is to be recalled that the opening 20 also is a passage or conduit through which the cut nylon pellet or plug 58 has to be inserted.

It is recognized in the art that the highest torque results from nylon which is smeared away from the drilled recess and compressed between threads of the screw and nut while it remains physically attached to the part of the nylon in the recess.

The present invention has overcome an important problem by providing a small sharp pin 56 on the end of the plunger 54 which actually picks up the cut pellet or plug of nylon, pushes it through the tapered sleeve 50 and transports it across an open space and then through the guide opening 20 provided in the mandrel 16 into the drilled recess 40 provided in the nut 24.

Referring now to FIGS. 8 and 9, an enlargement of part of the finished nut 24 is shown. It should be noted that the sides of the plastic pellet or plug 58 which extend into the bore of the nut 24 are at approximately a 45° angle with respect to the axis of the nut 24. This is an important advantage over prior art constructions since either side of the plug 58 will present the same angle to the approaching end of a screw or bolt independently of which side of the nut 24 is used.

The mandrel 60 not only eliminates the void at the bottom of the recess 40 but also provides a permanent shape to the inwardly facing end of the plug 58 as illustrated in FIG. 9. The resultant torque permitted on the plug 58 may be controlled by the depth to which the mandrel 60 is inserted into the recess of the nut 24 or by the size of the mandrel utilized.

While the present invention has been heretofore primarily discussed with reference to one side of the plug making an angle of approximately 45°, it has been found that a range of 35°–55° is suitable for many applications. In such instances, the slope of the mounting surface 14 would equal the requisite angle of the side of the plug.

The drawing and the foregoing specification constitute a description of the improved friction nut in such full, clear, concise and exact terms as to enable any person skilled in the art to practice the invention, the scope of which is indicated by the appended claim.

What I claim as my invention is:

A fastener comprising a nut having a screw-threaded opening having an axis and providing an inner peripheral wall adapted to engage an externally screw-threaded element, said peripheral wall having a recess in one side only thereof, said recess having a cylindrical side wall which terminates in a closed bottom wall, said recess extending from said opening through the threads thereof a part of the distance only through said peripheral wall at approximately a 45° angle with respect to the axis of the nut such that the projection of the recess extends through an end of said opening whereby the recess may be drilled by a tool inserted in said opening, and a solid plug of plastic material deformable only under a very great pressure secured in and premanently deformed to conform to and completely fill said recess, the top portion of said plug extending above the bottom and crest of said threads so as to be deformed by the engaging threads of the threaded element for exerting locking pressure thereon, said top portion consisting of three pronounced exposed surfaces including a pair of end surfaces which are separated by an inwardly facing top surface, the end surfaces facing the ends of said opening and extending above the bottom and crest of said threads and forming angles of approximately 45° with respect to the axis of the opening so as to present substantially the same angle to the approaching end of the threaded element independent of which end of the opening the threaded element enters first, and the inwardly facing top surface of said plug extending between said end surfaces and being permanently pressure formed to a substantially concave shape due to the internal forces in the plastic material created by the aforesaid pressure which overcome the plastic memory of the material and being completely covered by the engaging threads of the threaded element when the threaded element is threaded in the opening of the nut.

References Cited by the Examiner

UNITED STATES PATENTS

| | | | |
|---|---|---|---|
| 2,520,122 | 8/1950 | Brutus | 151—7 |
| 2,663,344 | 12/1953 | Burdick | 151—7 |
| 3,010,503 | 11/1961 | Beuter | 151—7 |
| 3,020,570 | 2/1962 | Wallace et al. | 151—7 |

FOREIGN PATENTS

| | | |
|---|---|---|
| 964,862 | 2/1950 | France. |
| 1,126,859 | 7/1956 | France. |
| 495,195 | 11/1938 | Great Britain. |

CARL W. TOMLIN, *Primary Examiner.*

M. PARSONS, JR., *Assistant Examiner.*